No. 10,024. PATENTED SEPT. 20, 1853.
J. BLACK.
PLANETARY HYDRAULIC STEAM ENGINE.
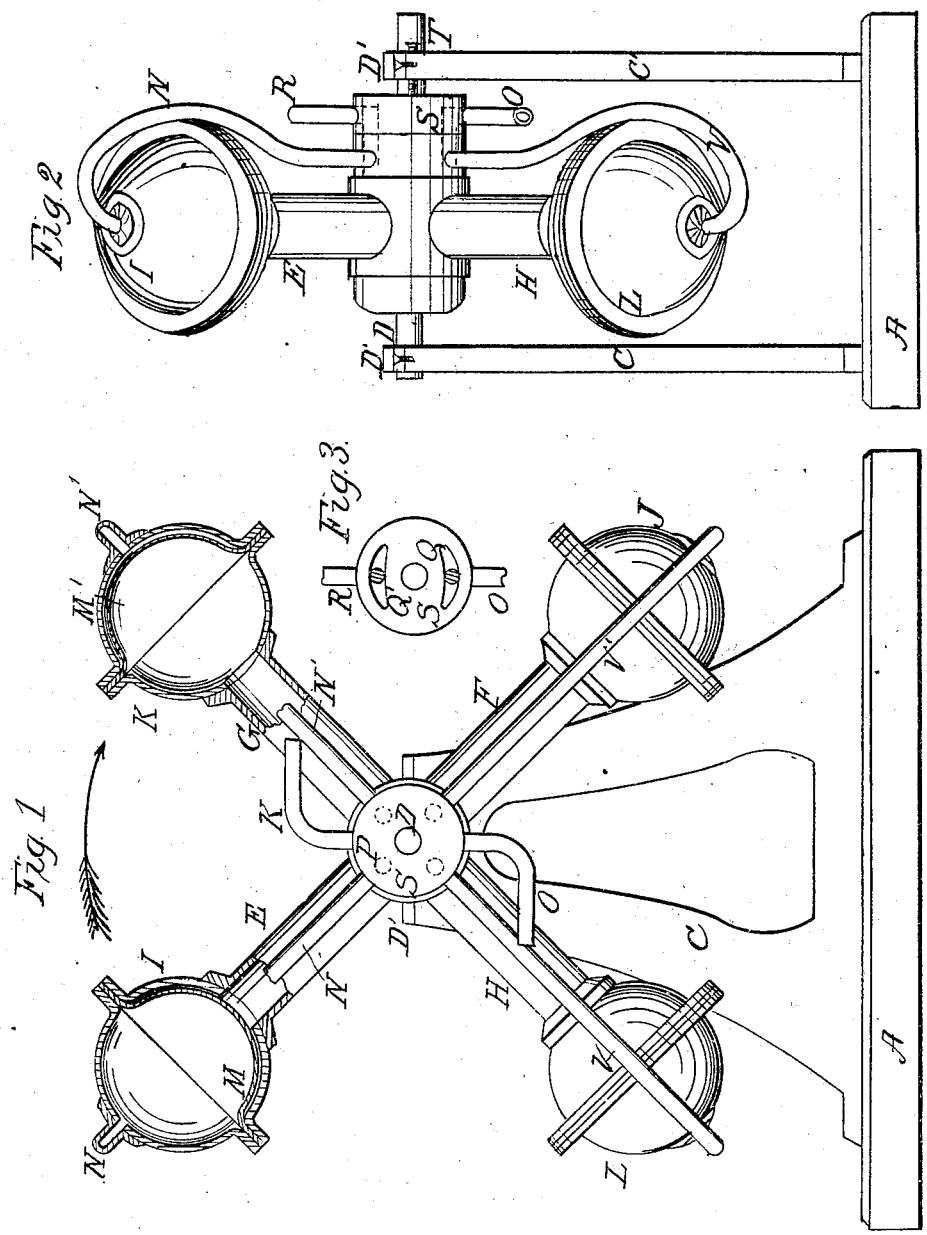

UNITED STATES PATENT OFFICE.

JAMES BLACK, OF PHILADELPHIA, PENNSYLVANIA.

PLANETARY HYDRAULIC STEAM-ENGINE.

Specification of Letters Patent No. 10,024, dated September 20, 1853.

*To all whom it may concern:*

Be it known that I, JAMES BLACK, of the city and county of Philadelphia, in the State of Pennsylvania, have invented a new and useful Planetary Hydraulic Steam-Engine; and I do hereby declare that the same is described and represented in the following specification and drawings.

The nature of my invention consists in a shaft fitted to turn in appropriate boxes, and provided with four hollow arms opening into vessels upon the ends of the arms, which vessels are furnished with flexible diaphragms of vulcanized india rubber or other materials; so that said vessels may be alternately filled with water and steam upon the opposite sides of the diaphragms without letting the steam come in contact with the water so as to condense it; the steam being supplied to the vessels through four pipes extending from the hub on the shaft to the outer extremities of the vessels; a stationary collar being fitted to the hub to which the supply and discharge pipes for the steam are connected, with openings in the collar which correspond with the openings from the steam pipes in the hub, so as to alternately fill the vessels with steam in the lower part of their circuit, thereby forcing the water into the opposite vessels in the upper part of the circuit so that the descending vessels are always full of water and the ascending vessels always empty or full of steam; so that the power of the engine depends upon the capacity of the vessels and the difference between the specific gravity of water and steam, and the length of the arms to which the vessels are fastened.

To enable others skilled in the art to make and use my invention, I will proceed to describe its construction and operation, referring to the above mentioned drawings in which the same letters indicate like parts in each of the figures.

Figure 1, is an elevation of one side, one of the frames which support the shaft being omitted. Fig. 2, is an elevation of one end. Fig. 3, is the face of the collar with a section of the supply and discharge pipes.

In the accompanying drawings A is the base to which the stands C C' are fastened having scores in them for the journal of the shaft D which is retained in the scores by the caps D', D'. The shaft D is enlarged as represented and is perforated so as to connect the cavities in the arms E and F; and also G and H, but these perforations are made so as not to interfere with, or open into each other. The arms above mentioned have the vessels I, J, K, and L fastened to their extremities which vessels are made globular consisting of two hemispherical sections with a flexible diaphragm M (see Fig. 1, where one half of the two upper vessels are represented in section so as to show the interior) which diaphragm is secured in its proper place by bolting the two hemispheres together, so that the edge of the diaphragm serves for packing between the flanges. There is a hole in the center of the vessel beyond the diaphragm to which the bent pipe N is applied and fastened to the vessel and to the shaft D and terminates in the face or hub of the shaft as represented by the dotted circle P, Fig. 1, so as to conduct the steam to and from the vessel; the steam is supplied through the pipe o and collar s which is fitted to the end of the large part of the shaft D. The openings Q Q' in the collar Fig. 3, correspond with the openings in the shaft represented by dotted circles in Fig. 1, so that as the openings in the shaft pass the elongated opening Q in the collar the vessels are fitted with steam and as they pass around the steam is discharged into the elongated opening Q' and escapes through the pipe R the collar S being held stationary in a proper position by two screws through the stand C', one of which is represented at T.

When the engine has been completed except putting on the outer portion of the vessels I and K, the arms E and F—should be brought to a perpendicular position and water poured into E so as to fill the vessel J, and arms E and F when the diaphragm M should be put in, in the position represented and the outer hemisphere screwed to the other and the pipe N attached as represented. The arms G and H should be brought to a perpendicular position and filled with water, and the diaphragm-hemisphere and pipe adjusted as abovementioned, so as to complete the engine ready for operation; the pipe O being connected to a boiler so as to supply the steam necessary; the vessel K must be moved a little past the perpendicular in the direction of the arrow, and the steam let on through the pipe O, so as to pass through the pipe V with sufficient pressure to force the water from L into K by pressing the diaphragm from the position represented at M′ into the position represented at M, or from the outer into the inner hemisphere, by filling the vessel L with steam and K with water, so that the weight of the water will carry the vessel K and arm G down and set the engine in motion, so that as the opening in the shaft (represented by the dotted circle) from the pipe V′ passes the opening Q in the collar; the steam passes through V′ into J and forces the water from J, during the lowest portion of the circuit into I during the highest portion of its circuit so that the vessel I descends with a force or power equal to the difference between the weight of the water in I and the steam in J; and as the rotation continues the water is forced from K into L; the steam from the vessels escapes during the upper portion of their circuit through the same pipe it entered into the opening Q′ in the collar, and from thence through the escape pipe R being driven out by the water which presses the diaphragms from the position represented at M into the position represented at M′ and the engine is kept in motion until the supply of steam is stopped; and a pulley or gear may be applied to the shaft D or an extension of it, to communicate motion and power for such purposes as it may be desirable.

I contemplate that a cylinder with pistons may be used upon the arms instead of the globular vessels with diaphragms: and also that more than four arms may be used, or that only two with a fly wheel if it should be necessary or desirable. And further that the engine may be modified in various ways without departing from the principles of my invention.

What I claim as my invention and desire to secure by Letters Patent, in the above described planting hydraulic steam engine, is—

The arrangement of the vessel's pipes and diaphragms or their equivalents upon a shaft so as to revolve with or upon said shaft substantially as described for the purposes set forth.

In testimony whereof, I have hereunto signed my name before two subscribing witnesses.

JAMES BLACK.

Witnesses:
J. W. BECK,
J. DENNIS.